(12) United States Patent
Künkel et al.

(10) Patent No.: US 7,877,983 B2
(45) Date of Patent: Feb. 1, 2011

(54) ARRANGEMENT FOR SUPPLYING A MEDIUM INTO AN EXHAUST GAS CONDUIT IN AN INTERNAL COMBUSTION ENGINE

(75) Inventors: Christian Künkel, Södertalje (SE); Björn Westerberg, Södertalje (SE); Anders Häggkvist, Segeltorp (SE)

(73) Assignee: Scania CV AB (SE)

( * ) Notice: Subject to any disclaimer, the term of this patent is extended or adjusted under 35 U.S.C. 154(b) by 691 days.

(21) Appl. No.: 11/573,324

(22) PCT Filed: Apr. 22, 2005

(86) PCT No.: PCT/SE2005/000584
§ 371 (c)(1),
(2), (4) Date: Jul. 19, 2007

(87) PCT Pub. No.: WO2006/014129
PCT Pub. Date: Feb. 9, 2006

(65) Prior Publication Data
US 2008/0092526 A1 Apr. 24, 2008

(30) Foreign Application Priority Data
Aug. 6, 2004 (SE) .................... 0401990

(51) Int. Cl.
| | |
|---|---|
| F01N 3/00 | (2006.01) |
| F23D 11/10 | (2006.01) |
| F23D 11/40 | (2006.01) |
| F23D 14/62 | (2006.01) |
| B05B 7/06 | (2006.01) |
| B05B 7/08 | (2006.01) |
| B05B 7/04 | (2006.01) |
| B05B 1/14 | (2006.01) |
| B05B 1/20 | (2006.01) |
| B05B 1/18 | (2006.01) |
| B01D 53/56 | (2006.01) |

(52) U.S. Cl. .......................... 60/286; 60/295; 239/418; 239/423; 239/424; 239/424.5; 239/426; 239/433; 239/434; 239/556; 239/557; 239/566; 239/567; 423/235

(58) Field of Classification Search ................... 60/286, 60/295; 239/556, 557, 566, 567, 418, 423, 239/424.5, 426, 433, 434; 423/235
See application file for complete search history.

(56) References Cited

U.S. PATENT DOCUMENTS 6,442,933 B2 * 9/2002 Rusch .................... 60/286
(Continued)

FOREIGN PATENT DOCUMENTS

DE 19913462 9/2000
(Continued)

OTHER PUBLICATIONS

File EPODOC/EPO, Hino Motors Ltd, "Exhaust Emission Control Device" JP, A, 2005076460, 20050324, figure 4.
(Continued)

Primary Examiner—Thomas E Denion
Assistant Examiner—Michael Carton
(74) Attorney, Agent, or Firm—Ostrolenk Faber LLP (57) ABSTRACT

An arrangement for supplying a medium to an exhaust line of a combustion engine. The arrangement comprises a first exhaust passage defined by at least a first wall surface of an element, and a dosing device supplying the medium to the first exhaust passage. The arrangement is adapted to maintaining a degree of heating of the first wall surface so that the latter will be at a higher temperature than the medium's vaporization point when the liquid medium is supplied in the first exhaust passage. Therefore, even the medium which reaches the first wall surface will vaporize in the first exhaust passage.

11 Claims, 4 Drawing Sheets

U.S. PATENT DOCUMENTS

| | | |
|---|---|---|
| 6,444,177 B1 | 9/2002 | Muller |
| 6,516,610 B2 * | 2/2003 | Hodgson .................. 60/286 |
| 6,601,385 B2 | 8/2003 | Verdegan et al. |
| 6,620,391 B2 | 9/2003 | Muller |
| 7,481,042 B2 | 1/2009 | Mahr |
| 2002/0187093 A1 | 12/2002 | Muller et al. |
| 2003/0079467 A1 * | 5/2003 | Liu et al. .................. 60/286 |
| 2003/0213234 A1 * | 11/2003 | Funk et al. ................ 60/286 |

FOREIGN PATENT DOCUMENTS

| | | |
|---|---|---|
| DE | 2004004738 | 8/2005 |
| EP | 0896831 | 2/1999 |
| EP | 1054139 | 11/2000 |
| EP | 1481719 | 12/2004 |
| JP | A-08-192028 | 7/1996 |
| JP | A-10-511038 | 10/1998 |
| JP | A-2000-507665 | 6/2000 |
| WO | WO 97/39226 | 10/1997 |
| WO | WO 9739226 | 10/1997 |
| WO | WO 0229219 | 11/2002 |
| WO | WO 03025357 | 3/2003 |

PUBLICATIONS

File EPODOC/EPO, Hitachi Ltd et al, "Method and Device for cleaning Engine Exhaust Gas", JP,A,2002306929, 20021022.

Database WPI Week 199640 Derwent Publications Ltd. London GB: Class D22, AN 1996-396296 & JP 8192028 A (Meidensha Corp), Jul. 30, 1996 abstract.

International Search Report PCT/SE2005/000584 Oct. 24, 2005 (Swedish Patent Office).

* cited by examiner

ARRANGEMENT FOR SUPPLYING A MEDIUM INTO AN EXHAUST GAS CONDUIT IN AN INTERNAL COMBUSTION ENGINE

CROSS REFERENCE TO RELATED APPLICATION

The present application is a 35 U.S.C. §§371 national phase conversion of PCT/SE2005/000584, filed 22 Apr. 2005, which claims priority of Swedish Application No. 0401990-7 filed 6 Aug. 2004. The PCT International Application was published in the English language.

BACKGROUND TO THE INVENTION, AND STATE OF THE ART

The invention relates to an arrangement for supplying a medium to an exhaust line of a combustion engine and for vaporizing the medium in the exhaust line.

A technique known as SCR (selective catalytic reduction) is used for reducing discharges of nitrogen oxides from diesel engines. This technique involves adding a solution of urea in a specified dose to the exhaust gases in the exhaust line of a diesel engine. The urea solution may be sprayed into the exhaust line in such a way that it is finely divided, after which the urea solution in contact with the hot exhaust gases vaporises and ammonia is formed. The mixture of ammonia and exhaust gases is led thereafter through a catalyst in which a chemical reaction takes place. The nitrogen of the nitrogen oxides in the exhaust gases reacts here with the nitrogen in the ammonia, with the result that nitrogen gas is formed. The oxygen of the nitrogen oxides reacts with the hydrogen in the ammonia, with the result that water is formed. The nitrogen oxides in the exhaust gases are thus reduced in the catalyst to nitrogen gas and water vapour. Correct dosage of urea enables the diesel engine's discharge of nitrogen oxides to be to a great extent reduced.

During large parts of the operating range of a diesel engine, the exhaust gases are at a sufficiently high temperature to vaporise the urea solution so that ammonia is formed. It is difficult, however, to prevent some of the urea supplied from coming into contact with and becoming attached to the inside wall surface of the exhaust line in an unvaporised state. The exhaust line of a vehicle is usually in contact with ambient air. The exhaust line is cooled by ambient air to a lower temperature than that of the exhaust gases inside the exhaust line. In most cases, however, the exhaust line is at a sufficiently high temperature to vaporise and convert to ammonia the urea solution which comes into contact with the inside wall surface of the exhaust line. In cases where the exhaust line is at too low a temperature to vaporise and convert the urea solution to ammonia, urea solution will accumulate on the inside wall surface of the exhaust line. The urea solution may crystallise on the inside of the exhaust line or leak out via joints of the exhaust line and crystallise on the outside of the exhaust line. This may lead to malfunctions.

SUMMARY OF THE INVENTION

The object of the present invention is to provide an arrangement which supplies a medium to an exhaust line of a combustion engine whereby the medium supplied is substantially certain to vaporise completely in the exhaust line even if the medium in liquid form reaches the inside wall surface of the exhaust line.

This object is achieved according to the invention. During large parts of the combustion engine's operating range, the exhaust gases are at a temperature which makes it possible for the medium supplied to vaporise when it mixes with the exhaust gases. Problems with vaporising the medium usually only arise when medium in liquid form reaches the inside wall surface and the inside wall surface is at too low a temperature to immediately vaporise the medium. Low temperature of the exhaust line may be due to cold ambient temperature or to the combustion engine working within an operating range in which the temperature of the exhaust gases is relatively low. High dosage of the medium may also lower the temperature on the first wall surface of the exhaust line considerably, since vaporising the medium consumes a good deal of thermal energy. According to the present invention, the arrangement comprises means adapted to maintaining a degree of heating of the first wall surface so that it will be at a higher temperature than the medium's vaporisation point when the liquid medium is supplied in the first exhaust passage. The first wall surface will thus be at a higher temperature than the medium in liquid form which reaches the first wall surface. There will thus be certainty of the liquid medium being able to heat up to a temperature at which it vaporises. According to one embodiment of the present invention, said means comprises a heat source which supplies heat to the first wall surface. The first wall surface can therefore, at least when necessary, be heated so that it is substantially continuously at a temperature higher than the medium's vaporisation point. The heat source may be an electrical heating element which supplies thermal energy to the first wall surface according to the latter's prevailing temperature. With advantage, however, said heat source comprises a second exhaust passage bounded by a second wall surface situated close to the first wall surface. The temperature of the exhaust gases is usually definitely higher than the medium's vaporisation point. It is therefore advantageous to utilise the existing thermal energy of the exhaust gases as the heat source. Leading exhaust gases through a second passage close to the first passage is a simple way of providing heat transfer to the first wall surface from the exhaust gases in the second exhaust passage. An element made of a material with good heat conducting properties will result in little resistance to the passing of thermal energy from the second wall surface to the first wall surface. The first wall surface will thus substantially continuously maintain a temperature corresponding to at least the medium's vaporisation point.

According to a preferred embodiment of the present invention, said element is tubular and is fitted in such a position inside the exhaust line that the first passage is provided inside the tubular element, and the second exhaust passage is provided between the outside wall surface of the tubular element and an inside wall surface of the exhaust line. Thus the inside wall surface of the tubular element constitutes the first wall surface and the outside surface of the tubular element constitutes the second wall surface. The exhaust gases in the exhaust line thus flow along both the inside and the outside of the tubular element. As the tubular element is entirely surrounded by gases, the whole tubular element will be at substantially the same temperature as the exhaust gases in the exhaust line. The inside wall surface of the tubular element will therefore also be at substantially the same temperature as the exhaust line. Since during the most relevant operating states the exhaust gases are at a temperature definitely higher than the medium's vaporisation point, the medium which in liquid form reaches the inside wall surface of the tubular element is certain to vaporise. The tubular element is preferably relatively thin and made of a metal material with good heat conducting properties. With advantage, the tubular element is fitted in a central position in the exhaust line. The result will be uniform flow of exhaust gases in the second exhaust passage round the tubular element. The tubular element may be applied in a substantially straight portion of an exhaust line, but it is possible for the tubular element to be situated in exhaust line sections of substantially any desired shape.

According to a preferred embodiment of the present invention, said element is a wall element applied in a spiral exhaust line and dividing a portion of the exhaust line into a first exhaust passage and a second exhaust passage. A spiral exhaust line is compact and heat transfer between adjoining radial portions of the exhaust line is not complicated. However, the sidewalls of a spiral exhaust line are usually in contact with ambient air. With a wall element as above, the first exhaust passage can be provided with sidewall surfaces heated by surrounding exhaust gases. The first passage can therefore be so arranged as to be completely surrounded by inside wall surfaces which are heated by surrounding exhaust gases.

According to an alternative embodiment of the present invention, the element constitutes an integral part of the exhaust line and said means comprises a thermally insulating material applied between the first wall surface and an environment. In this case the element is shaped like the exhaust line but may be made of a material with considerably higher thermally insulating properties than the exhaust line elsewhere. Alternatively, a suitable insulating material of appropriate thickness may be applied round the outside surface of the element. With such a thermally insulating material, the cooling action of the environment on the inside wall surface can be substantially eliminated. The inside wall surface of the element will then only be heated by the exhaust gases flowing through the first exhaust passage, but this heat supply is usually amply sufficient to cause the medium in liquid form which reaches the inside wall surface to vaporise, since the cooling action of the environment on the first wall surface has been eliminated.

According to another preferred embodiment of the present invention, the dosing device comprises a spray nozzle by which the medium is sprayed into said first exhaust passage. A spray nozzle results in very fine division of the liquid medium being sprayed into the tubular element. The result is rapid and effective vaporisation of the medium when it mixes with the exhaust gases flowing through the tubular element. With advantage, the medium is a urea solution and the exhaust line contains a catalyst. In particular, when the technique known as SCR (selective catalytic reduction) is used, a urea solution can be used for providing ammonia, which is a necessary substance for effecting a chemical reaction whereby the nitrogen oxides in the exhaust gases are reduced to nitrogen gas and water vapour. A urea solution is easy to handle and store because it is both relatively odourless and non-toxic. Supplying the urea solution in well-defined doses enables the diesel engine's discharge of nitrogen oxides to be considerably reduced. The present invention makes it possible for an optimum supply of urea to be provided, with the result that all the urea solution supplied is certain to vaporise. It is also possible with the present invention to supply other media than urea to the exhaust line.

According to another preferred embodiment of the present invention, the inside wall surface of the element comprises at least one region with an uneven surface. The result is that in that region the tubular element has a larger inside wall surface than in the case of an even surface. An uneven wall surface detains liquid urea solution until it vaporises. The inside wall surface of the element may comprise at least one recess which has an extent in a direction substantially perpendicular to the direction of flow of the exhaust gases in the first exhaust passage. The liquid medium is thus effectively detained in the recess until it vaporises. Such recesses at suitable locations make it possible for the element to be of reduced length.

According to another preferred embodiment of the present invention, said nozzle comprises a plurality of radial apertures which lead the medium in the first exhaust passage in directions substantially perpendicular to the main direction of flow of the exhaust gases in the first exhaust passage. The liquid medium thus meets the exhaust flow in such a way that a large proportion of the medium is entrained by the flowing exhaust gases and vaporises before it reaches an inside wall surface of the first exhaust passage. Said nozzle may be applied in a curved first exhaust passage situated in a portion of a spiral exhaust line which extends about a central axis, whereby the positioning of the nozzle apertures is such that the medium is supplied in directions which predominantly lead the medium radially inwards towards said central axis in the curved first exhaust passage. A liquid medium which is heavier than the exhaust gases and is flung radially outwards by centrifugal force in a curved exhaust passage may well result in a relatively large proportion of the medium supplied accumulating on a radially outside wall surface of the exhaust passage. This entails a risk of the temperature of this limited surface being lowered to a level such that the accumulated medium does not vaporise quickly enough. To counteract such accumulation, the medium is therefore distributed by the nozzle predominantly radially inwards so that such accumulation of the medium on a radially outside wall surface of the exhaust passage is prevented.

According to another preferred embodiment of the present invention, the first exhaust passage is bounded in an axial direction relative to said central axis by two wall elements situated at a distance from one another, and in a radial direction relative to said central axis by an outer wall element and an inner wall element, whereby the nozzle is adapted to supplying the medium in at least one direction towards each of the axial wall elements and the radial inner wall element, but not in any direction towards the radial outer wall element. Suitable distribution of the nozzle apertures enables the medium to be supplied substantially uniformly to the axial wall elements and the radial inner wall element. The radial outer wall element may also receive a corresponding amount of the medium when the liquid medium supplied is led radially outwards by centrifugal force in the curved exhaust passage. With advantage, the nozzle is fitted in the first exhaust passage at a position situated closer to the radial outer wall element than the radial inner wall element. As the medium is substantially supplied more or less radially inwards in the spiral exhaust passage, the distance between the nozzle apertures and their intended liquid contact areas on inside surfaces of the exhaust passage is thereby increased. Increasing this distance enables a larger proportion of the amount of medium supplied to be entrained by and vaporised in the exhaust flow before it reaches an inside surface of the exhaust passage.

BRIEF DESCRIPTION OF THE DRAWINGS

Preferred embodiments of the invention are described below with reference to the attached drawings, in which.

DETAILED DESCRIPTION OF PREFERRED EMBODIMENTS OF THE INVENTION

Figure 1:
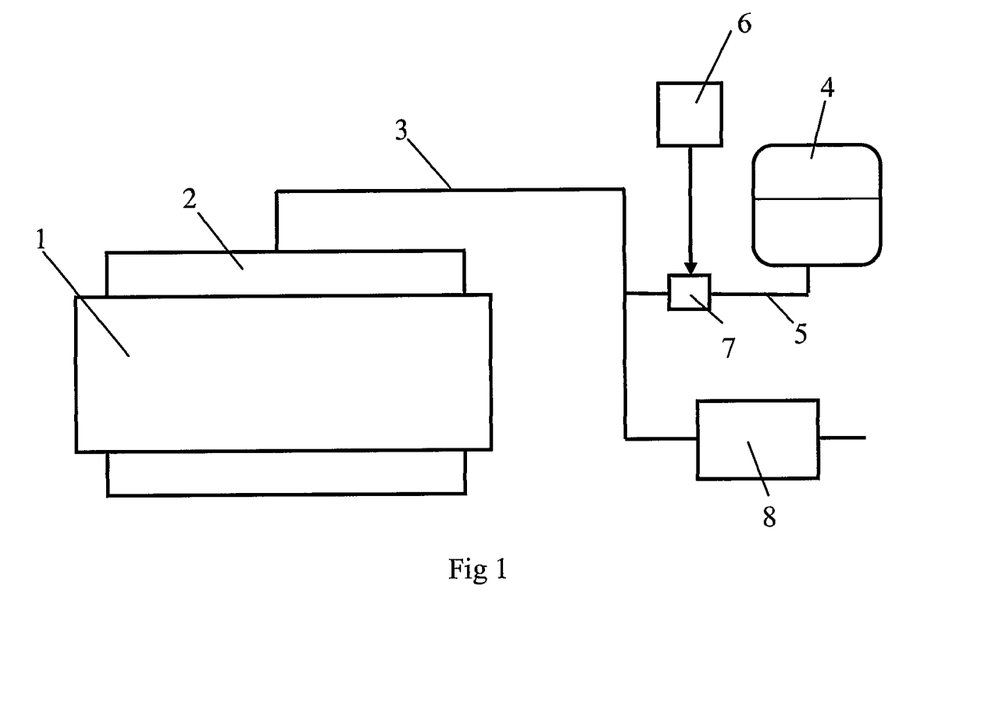
FIG. 1 depicts a diesel engine with an exhaust line which is provided with catalytic exhaust cleaning according to the method known as SCR.

FIG. 1 depicts a combustion engine in the form of a diesel engine 1. The diesel engine 1 may for example be intended to power a heavy vehicle. The exhaust gases from the cylinders of the diesel engine 1 are led via an exhaust manifold 2 to an exhaust line 3. In this case the exhaust line 3 is provided with an arrangement which effects catalytic exhaust cleaning according to the method known as SCR (selective catalytic reduction). This method entails a urea solution being added to the exhaust gases in the diesel engine's exhaust line 3. The urea solution is stored in a tank 4 and is led via a line 5 to the exhaust line 3. A control unit 6, which may be a computer unit with suitable software, controls the supply of the urea solution which is led to the exhaust line 3 by activating a pump 7. The control unit 6 may use information concerning current fuel consumption and the temperature of the exhaust gases to calculate the amount of urea solution which needs to be added for optimum reduction of the nitrogen oxides content of the exhaust gases. The urea solution supplied is intended to be heated by the exhaust gases in the exhaust line 3 so that it vaporises and converts to ammonia. The mixture of ammonia and exhaust gases is thereafter led on through the exhaust line 3 to a catalyst 8 in which a chemical reaction takes place. The nitrogen of the nitrogen oxides in the exhaust gases reacts here with the nitrogen in the ammonia, with the result that nitrogen gas is formed. The oxygen of the nitrogen oxides reacts with the hydrogen in the ammonia, with the result that water is formed. The nitrogen oxides in the exhaust gases are thus reduced in the catalyst 8 to nitrogen gas and water vapour which are led out to ambient air.

Figure 2:
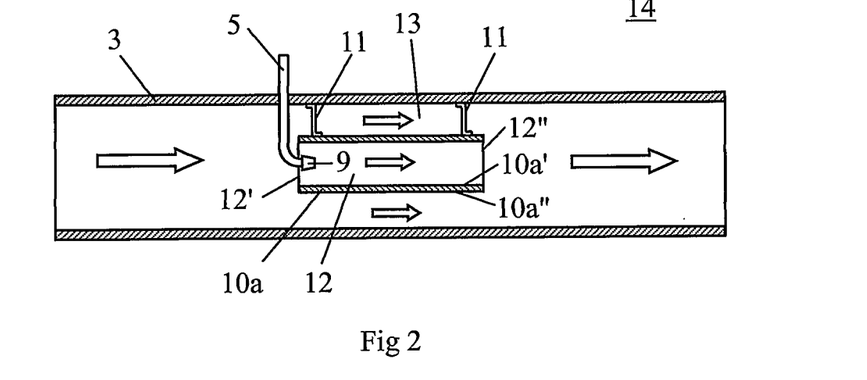
FIG. 2 depicts an arrangement according to a first embodiment of the invention.

FIG. 2 depicts an arrangement for supplying urea solution to the exhaust line 3. The line 5 intended to carry the urea solution extends here through an aperture in a wall of the exhaust line 3. The line 5 has a curved end portion to which a spray nozzle 9 is fastened. A tubular element 10a narrower than the exhaust line 3 is fitted by suitable fastening means 11 in a substantially central position inside the exhaust line 3. The exhaust gases flow in the direction of the arrows inside the exhaust line 3. The tubular element 10a has an inside wall surface 10a' which defines a first passage 12 for the exhaust gases. The first exhaust passage 12 extends between an inlet 12' and an outlet 12".

In this case the urea solution is sprayed by the spray nozzle 9 into the first exhaust passage 12 close to the latter's inlet 12'. The urea solution added will thus be entrained by the exhaust flow through substantially the whole of the first exhaust passage 12. As the tubular element 10a is narrower than the exhaust line 3, a second exhaust passage 13 is constituted radially about the outside of the tubular element 10a. The second exhaust passage 13 has a radial extent between an outside wall surface 10a" of the tubular element 10a and an inside wall surface of the exhaust line 3. The exhaust gases in the exhaust line 3 will thus flow in parallel through the first exhaust passage 12 and the second exhaust passage 13.

The tubular element's outside wall surface 10a" is therefore in contact with the exhaust gases flowing through the second exhaust passage 13. The tubular element's outside wall surface 10a" will thus maintain a temperature substantially corresponding to that of the exhaust gases. The tubular element 10a has with advantage relatively thin walls and is with advantage made of a material with good heat conducting properties. Heat can thus quickly be transferred from the outside wall surface 10a" to the inside wall surface 10a' when there is a temperature difference between these surfaces. Such a temperature difference may temporarily occur when urea solution vaporises on the inside wall surface 10a', since this vaporisation process consumes a good deal of thermal energy. The supply of heat from the second exhaust passage 13 nevertheless keeps the inside wall surface 10a' at a temperature which exceeds the urea solution's vaporisation point.

When exhaust gases flow through the exhaust line 3, urea solution is sprayed into the first exhaust passage 12 inside the tubular element 10a via the spray nozzle 9 in a dose calculated by the control unit 6. The urea solution has a vaporisation point which in normal circumstances is lower than the temperature of the exhaust gases but higher than the temperature of the environment 14. The urea solution finely divided via the spray nozzle 9 mixes with the exhaust gases flowing through the first exhaust passage 12. The hot exhaust gases heat the finely divided urea solution so that it vaporises and forms ammonia. However, some of the liquid urea solution is not vaporised by the exhaust gases before it reaches the inside wall surface 10a'. The inside wall surface 10a' maintains a higher temperature than the urea solution's vaporisation point. The urea solution which reaches the inside wall surface 10a' is therefore subjected to heating until it vaporises. A suitably dimensioned tubular element 10a makes it possible for substantially all the urea solution supplied in the first exhaust passage 12 to vaporise and form ammonia in the first exhaust passage 12. The tubular element 10a may for example be 100 to 200 mm long with a diameter of 80 to 100 mm, but its dimensions have also to be adapted according to the dimensions of the exhaust line 3.

Figure 3:
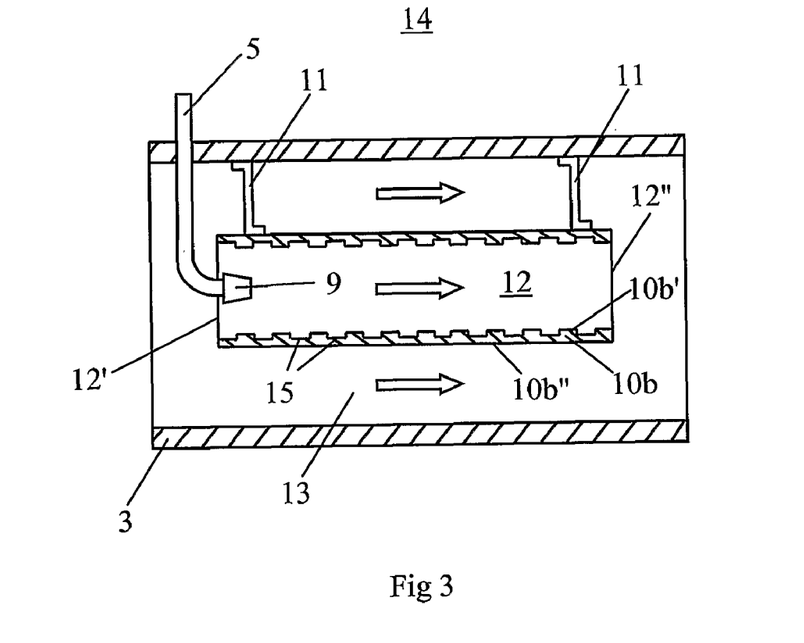
FIG. 3 depicts an arrangement according to a second embodiment of the invention.

FIG. 3 depicts an alternative arrangement for supplying a urea solution to an exhaust line 3. This arrangement differs from the arrangement in FIG. 2 in that the tubular element 10b depicted here has an inside wall surface 10b' which comprises a plurality of annular recesses 15 which extend in a direction substantially perpendicular to the direction of flow of the exhaust gases through the first exhaust passage 12. However, the tubular element 10b has an even outside wall surface 10b". Urea solution which reaches the inside wall surface 10b' will accumulate in said recesses 15 until the urea solution vaporises. Such recesses 15 prevent any certainty of the urea solution being entrained by the exhaust gas flow through the first exhaust passage 12 and out through the outlet 12" before it vaporises. The tubular element 10b may in this case be of reduced length as compared with a tubular element 10a which has an even inside wall surface 10a".

Figure 4:
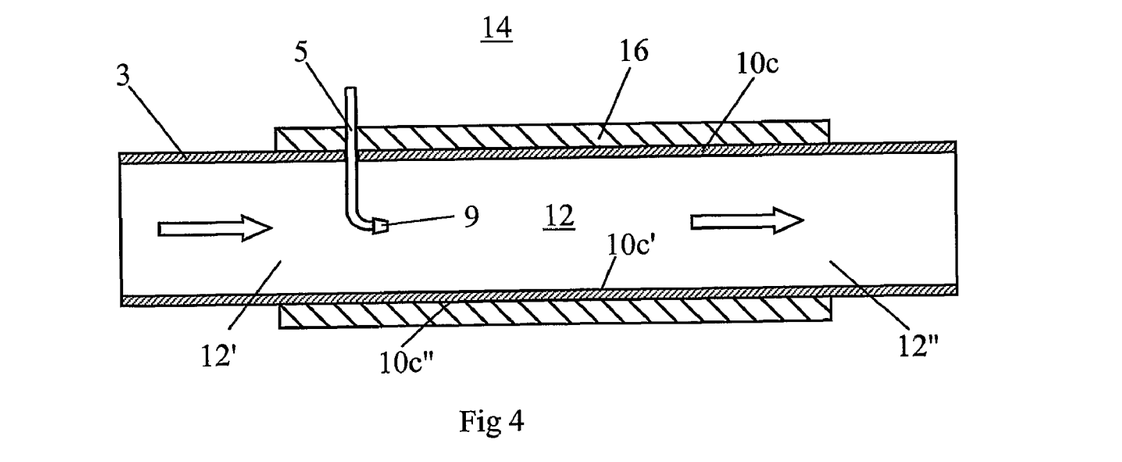
FIG. 4 depicts an arrangement according to a third embodiment of the invention.

FIG. 4 depicts a further arrangement for supplying a urea solution to an exhaust line 3. In this case a tubular element 10c which constitutes an integral part of the exhaust line 3 is used. The shape and size of the tubular element 10c correspond to those of the exhaust line 3. A thermally insulating material 16 is applied externally round the outside wall surface 10c" of the tubular element 10c. Other portions of the exhaust line 3 may possibly also be provided wholly or partly with thermally insulating material. The thermally insulating material 16 prevents the inside wall surface 10c' of the tubular element being cooled down by ambient air, which is usually at a definitely lower temperature than the urea solution's vaporisation point. Suitable choice and suitable thickness of the insulating material 16 will enable the cooling action of the environment 14 upon the tubular element's inside wall surface 10c' to be substantially eliminated. In this case the tubular element 10c constitutes a gas passage 12 through which all the exhaust gases in the exhaust line 3 flow. The exhaust gases heat the inside wall surface 10c' of the tubular element 10c. As the insulating material 16 substantially eliminates the heat losses to the environment 14, the inside wall surface 10c' can maintain a temperature at least corresponding to the urea solution's vaporisation point. When the diesel engine 1 is activated, urea solution is sprayed into the first exhaust passage 12 close to the inlet 12'. The exhaust gases heat the finely divided urea solution so that it vaporises and forms ammonia. The urea solution which reaches the inside wall surface 10c' is subjected to heating by the inside wall surface 10c' until it vaporises. The length of the tubular element 10c is such that substantially all the urea supplied vaporises inside the tubular element 10c.

Figure 5:
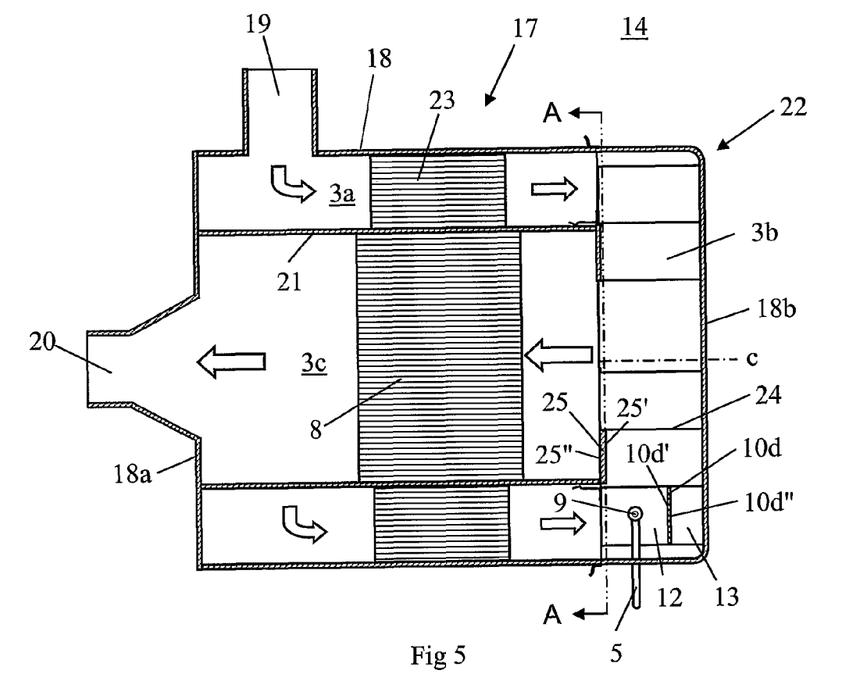
FIG. 5 depicts an arrangement according to a fourth embodiment of the invention.

FIG. 5 depicts a container 17 in the form of a combined silencer and exhaust cleaner intended to be applied in an exhaust system for a diesel-powered vehicle. The container 17 comprises an external housing 18 which is of substantially circular cylindrical shape. The housing 18 constitutes a closed outside wall surface except at the points where an inlet 19 and an outlet 20 are provided for the exhaust gases. A circular pipe 21 is arranged inside the housing 18. The length of the pipe 21 is such that it extends from a first endwall 18a of the housing to a module 22 which comprises a second endwall 18b of the housing. The container device 17 comprises an exhaust line 3 which extends from the inlet 19 to the outlet 20. The exhaust line comprises after the inlet 19 a first exhaust line section 3a which has a substantially straight extent about the outside of the pipe 21 from the inlet 19 to the module 22. A particle filter 23 is arranged in the first exhaust line section 3a. When the exhaust gases pass through the particle filter 23, the soot particles in the exhaust gases are caught in the particle filter 23 and thereafter burn therein.

Figure 7:
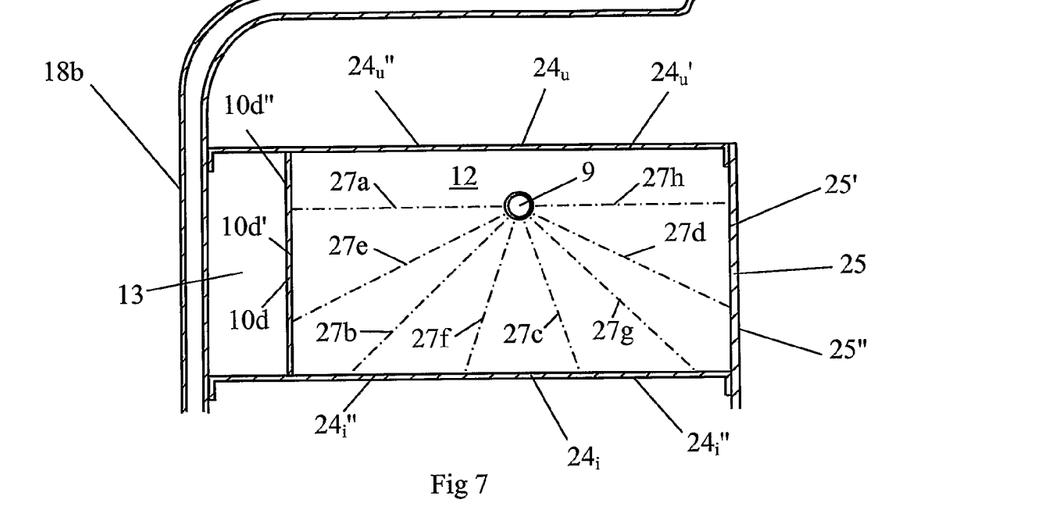
FIG. 7 depicts a section through an exhaust passage with a nozzle for supply of urea solution.

The exhaust gases cleaned of soot particles are thereafter led into the module 22 which comprises a wall element 24. The wall surfaces of the wall element 24 define a second exhaust line section 3b which extends about a central axis c. The lateral extent of the spiral second exhaust line section is bounded by the second endwall 18b and a wall element 25 of the module 22. The spiral element 24 and the wall element 25 have wall surfaces which on both sides are in contact with exhaust gases, but the outside wall surface of the endwall 18b is in contact with ambient air 14. An extra wall element 10d is arranged in part of the spiral exhaust line section 3b. The extra wall element 10d divides that portion of the spiral exhaust line 3b into a first gas passage 12 and a second gas passage 13. The first exhaust passage 12 is bounded laterally by the extra wall element 10d. The extra wall element 10d has wall surfaces which on both sides are surrounded by exhaust gases. The first exhaust passage 12 will therefore be bounded in an axial direction relative to said central axis c by the wall elements 25, 10d which have wall surfaces which on both sides are surrounded by exhaust gases. The first exhaust passage 12 is bounded in a radial direction relative to said central axis c by a radially inner portion of the spiral wall element $24_i$ and a radially outer portion of the spiral wall element $24_u$, which are thus also surrounded by exhaust gases on both sides (see FIG. 7).

Figure 6:
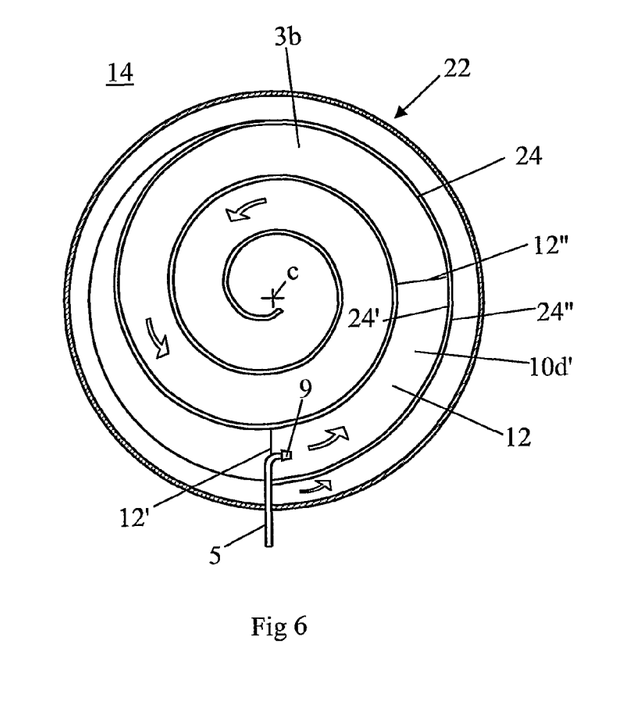
FIG. 6 depicts a cross-section along the plane A-A in FIG. 5.

The urea solution is sprayed by the spray nozzle 9 into the first exhaust passage 12 close to the latter's inlet 12' (see FIG. 6). The urea solution added therefore mixes with the exhaust gases in the first exhaust passage 12. The first exhaust passage 12 is bounded by inside wall surfaces $24_i'$, $24_u'$, 25', 10d' of the wall elements $24_i$, $24_u$, 25, 10d, which have outside wall surfaces $24_i''$, $24_u''$, 25'', 10d'' heated by surrounding exhaust gases. Outside wall surfaces means the surfaces of the wall elements $24_i$, $24_u$, 25, 10d which are situated on the opposite side of the inside surfaces $24_i'$, $24_u'$, 25', 10d'. The portion of the urea solution supplied which is carried by the exhaust gas flow into the first exhaust passage 12 is heated by the exhaust gases so that it vaporises and converts to ammonia. The portion of urea solution which reaches the inside wall surfaces $24_i'$, $24_u'$, 25', 10d' is heated by the inside wall surfaces $24_i'$, $24_u'$, 25', 10d' which are supplied with heat from surrounding exhaust gases. The inside wall surfaces $24_i'$, $24_u'$, 25', 10d' are thus provided with a temperature which exceeds the urea solution's vaporisation point. The urea solution which reaches the inside wall surfaces $24_i'$, $24_u'$, 25', 10d' will therefore substantially always vaporise and convert to ammonia.

Figure 8:
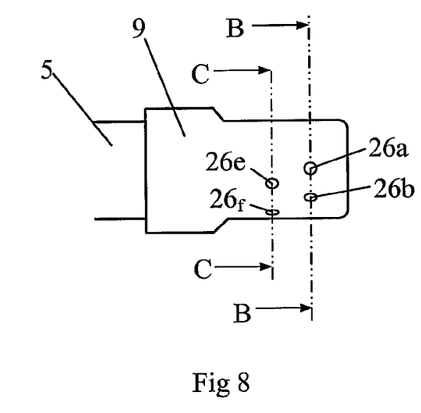
FIG. 8 depicts the nozzle in FIG. 7 in more detail.

However, there is a risk of urea solution supplied in a spiral exhaust passage 12 being at least partly flung radially outwards by centrifugal force with the result that a relatively large proportion of the urea solution supplied may reach the outside wall surface $24_u$ of the radially outer portion $24_u$ of the spiral element. If a large amount of urea solution reaches a relatively limited surface, the temperature of that surface may be lowered to a level at which the urea solution does not vaporise quickly enough. This entails a risk of crystals forming. To counteract such an accumulation of urea solution on a limited surface, a specially designed nozzle 9 is used. The nozzle 9 is depicted separately in FIGS. 8-10. The nozzle 9 has eight radial apertures 26a-h which spray urea solution in eight different directions 27a-h in the first exhaust passage 12. The nozzle 9 has a first row of four apertures 26a-d depicted in FIG. 9 and a second row of four apertures 26e-h depicted in FIG. 10. Two of the nozzle's apertures 26a, e are directed in such a way that the urea solution is sprayed in the directions 27a, e towards the inside surface 10d' of the extra wall element 10d. Four of the nozzle's apertures 26b, c, f, g are directed in such a way that the urea solution is sprayed in the directions 27b, c, f, g towards the inside surface $24_i'$ of the radially inner portion of the spiral element. Two of the nozzle's apertures 26d, h are directed in such a way that the urea solution is sprayed in the directions 27d, h towards the inside wall surface 25' of the wall element 25. However, none of the nozzle's apertures 26a-h are directed in such a way that the urea solution is sprayed towards the radially outer portion $24_u$ of the spiral element. The directions 27a-h are chosen such that the portion of the urea solution which is not entrained by the exhaust flow reaches these inside surfaces $24_i'$, 25', 10d' with a substantially uniform distribution. Although the nozzle 9 has no aperture directed towards the radially outer portion $24_u$ of the spiral element, some of the urea solution supplied may still reach its inside surface $24_u'$ as a result of centrifugal force.

Figure 9:
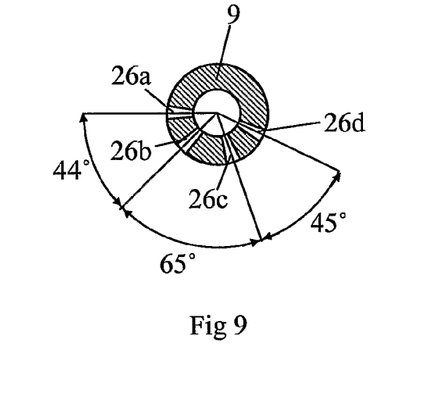
FIG. 9 depicts a cross-section of the nozzle in FIG. 8 along the plane B-B and FIG. 10 depicts a cross-section of the nozzle in FIG. 8 along the plane C-C.
Figure 10:
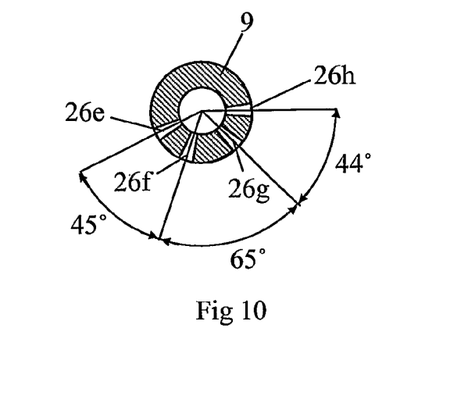

FIGS. 9 and 10 show examples of suitable angular spacing between the apertures 26a-h in the two rows mentioned. The apertures 26a-h are here distributed over an angular range of 180°. Such a nozzle 9 subjects the portion of the urea solution which reaches the inside wall surfaces $24_i'$, $24_u'$, 25', 10d' to a substantially optimum distribution. Urea solution is therefore prevented from accumulating within a specified surface and the urea solution which reaches a wall surface of the first exhaust passage 12 will therefore vaporise relatively quickly. It is nevertheless desirable that as small a proportion of the urea solution supplied as should reach an inside wall surface $24_i'$, $24_u'$, $25'$, $10d'$ of the first exhaust passage 12. The first exhaust passage 12 has an axial extent between the two wall elements 10d, 25. The nozzle 9 is situated substantially midway between the two wall elements 10d, 25. The spray directions 27a, e of the nozzle 9 towards the wall element 10d and the spray directions 27d, h of the nozzle 9 towards the wall element 25 present corresponding angles. Urea solution will therefore substantially equally reach the wall elements 10d, 25. The first exhaust passage 12 has a radial extent between the radially inner portion of the spiral element $24_i$ and the radially outer portion of the spiral element $24_u$. The nozzle 9 is situated closer to the radially outer portion of the spiral element 24, than the radially inner portion of the spiral element $24_i$. The distance between the plurality of apertures of the nozzle 9 and the respective liquid contact regions on the inside wall surfaces $10d'$, $24_i'$, $25'$ of the first exhaust passage 12 is thus increased. Increasing this distance causes a greater proportion of the amount of urea solution supplied to be entrained by the exhaust flow and vaporised before it reaches an inside surface $10d'$, $24_i'$, $25'$. As the urea solution is only supplied in specified directions 27a-h substantially radially inwards and the nozzle 9 is, as previously mentioned, situated in an externally radial position within the first exhaust passage 12, all the urea solution supplied will be certain to vaporise and convert to ammonia before it flows out through the outlet 12" of the first exhaust passage.

The exhaust gases in the second exhaust line section 3b thus flow in this case in parallel through the first exhaust passage 12 and the second exhaust passage 13. The parallel exhaust flows unite at the outlet 12" of the first exhaust passage. The mixture of exhaust gases and ammonia is led on radially inwards in the spiral exhaust line 3b until it reaches a central position in the module 22. Here it is led out from the module 22 to a third exhaust line section 3c which has a substantially rectilinear extent inside the pipe 21. The third exhaust line section 3c contains a catalyst 8. When the mixture of ammonia and exhaust gases is led through the catalyst 8, the nitrogen of the nitrogen oxides in the exhaust gases reacts with the nitrogen in the ammonia, with the result that nitrogen gas is formed. The oxygen of the nitrogen oxides reacts with the hydrogen in the ammonia, with the result that water is formed. The nitrogen oxides in the exhaust gases are thus reduced in the catalyst 8 to nitrogen gas and water vapour before they are led out from the container 17 via the outlet 20.

The invention is not limited to the embodiments depicted in the drawings but may be varied freely within the scopes of the claims.

The invention claimed is:

1. An arrangement for supplying a urea solution to an exhaust line of a combustion engine that contains a catalyst for catalyzing ammonia in the exhaust line, the arrangement comprising:

an element defined by at least a first wall surface forming a first exhaust passage, the element being a wall element of a spiral exhaust line and dividing a portion of the spiral exhaust line into a first exhaust passage and a second exhaust passage;

a dosing device including a spray nozzle operable to spray the urea solution into the first exhaust passage, to the exclusion of spraying urea into the second exhaust passage;

a heating system including the second exhaust passage bounded by a second wall surface situated close to the first wall surface and operable to supply heat to the first wall surface, a first wall surface operable to maintain a degree of heating of the first wall surface so that the first wall surface is at a higher temperature than a vaporization point of the urea solution when the liquid urea solution in a liquid form is supplied in the first exhaust passage by the dosing device.

2. An arrangement according to claim 1, wherein the element includes an inside wall surface that comprises at least one region with an uneven surface.

3. An arrangement according to claim 2, wherein the inside wall surface of the element comprises at least one recess which has a greater dimension thereof lying in a direction substantially perpendicular to a direction of flow of the exhaust gases in the first exhaust passage.

4. An arrangement according to claim 1, wherein the nozzle comprises a plurality of radial apertures which lead the medium in the first exhaust passage in directions substantially perpendicular to the main direction of flow of the exhaust gases in the first exhaust passage.

5. An arrangement according to claim 4,
the nozzle comprises a curved first exhaust passage situated in a portion of the spiral exhaust line which extends around a central axis, whereby the positioning of the apertures of the nozzle is such that the medium is supplied in directions which predominantly lead the medium radially inwards towards the central axis in the curved first exhaust passage.

6. An arrangement according to claim 5, wherein the first exhaust passage is bounded in an axial direction relative to the central axis by two wall elements situated at a distance from one another, and in a radial direction relative to the central axis by an outer wall element and an inner wall element, whereby the nozzle is adapted to supplying the medium in at least one direction towards each of the axial wall elements and the inner radial wall element, but not in a direction towards the outer radial wall element.

7. An arrangement according to claim 6, wherein the nozzle is fitted in the first exhaust passage at a position situated closer to the radial outer wall element than the radial inner wall element.

8. An arrangement according to claim 1, wherein the nozzle comprises one or more apertures oriented to spray the urea solution towards an inside surface of the first exhaust passage.

9. An arrangement according to claim 8, wherein the first wall surface faces the one or more apertures and is positioned between the nozzle and the second exhaust passage.

10. An arrangement according to claim 1, wherein the nozzle is oriented to spray urea solution into the first exhaust passage close to the inlet thereof.

11. An arrangement according to claim 8, wherein the one or more apertures each have a longitudinal axis thereof which extends to intersect an inside surface of the first exhaust passage.

* * * * *